UNITED STATES PATENT OFFICE 2,175,048

PLASTICIZER

Claude H. Alexander, Cuyahoga Falls, Ohio, assignor to The B. F. Goodrich Company, New York, N. Y., a corporation of New York No Drawing. Application March 18, 1937,
Serial No. 131,662

8 Claims. (Cl. 260—36)

This invention relates to plasticizers and to plastic compositions containing them, and has as its principal object to provide plasticizers which improve the acid-resisting and dielectric properties of compositions in which they are used.

Plastic compositions frequently require plasticizers to render them less brittle and more easily workable. Plasticizers are also used in lacquers and paints containing plastics to impart the desired flexibility to films formed therefrom. The plasticizers of my invention are particularly useful in the polyvinyl halide compositions described in United States Patent No. 1,929,453 issued to Waldo L. Semon, for their incorporation therein improves the properties of the compositions.

I have discovered that members of the class of compounds having the structural formula

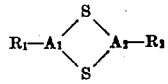

wherein $R_1$ and $R_2$ represent any aliphatic or alicyclic hydrocarbon group containing between two and six carbon atoms, and $A_1$ and $A_2$ represent aromatic hydrocarbon nuclei with the sulfur linkages in the ortho position are excellent plasticizers. Typical members of this class include bis-ethyl-o-phenylene disulfide, bis-cyclohexyl-o-phenylene disulfide, bis-amyl-o-phenylene disulfide, bis-isopropyl-o-phenylene disulfide, bis-cyclohexyl-naphthylene disulfide, and amylnaphthylene ethylphenylene disulfide. The compounds are named without specifying the positions of $R_1$ and $R_2$ because I prefer to use isomeric mixtures rather than pure compounds. Not only are isomeric mixtures easier and cheaper to prepare, but they sometimes have more desirable properties than the pure compounds. 2—6 diethyl thianthrene, for instance, is a solid at room temperatures. The isomeric mixture of the ethyl thianthrenes which I call bis-ethyl-o-phenylene disulfide is an oil with excellent plasticizing properties. The compounds in which R contains less than two carbon atoms are either solids or very viscous liquids with melting points so high that they are not generally useful as plasticizers. When R contains more than six carbon atoms the length of the side chain reduces the solubility of the polyvinyl halides in the compounds to such an extent that they are no longer satisfactory plasticizers.

I usually prefer to use as plasticizers compounds in which $R_1=R_2$ and $A_1=A_2$, since they are very easily prepared in good yields. Bis-ethyl-o-phenylene disulphide, for instance, is prepared by reacting ethyl benzene with sulfur monochloride or sulfur in the presence of aluminum chloride or other acidic catalysts. The other bis-compounds of this invention may be prepared in the same manner, substituting the appropriate derivative for the ethyl benzene.

The plasticizers of this invention may be incorporated in the composition by any of the well known methods. The polyvinyl halide may be dissolved in the plasticizer at elevated temperatures. For instance, gamma polyvinyl chloride may be dissolved in an equal weight of bis-cyclohexyl-o-phenylene disulfide at about 120° C. The plasticizer may be added to the composition on a heated roll-mill, or the mixing may be done in an internal mixer. I usually combine from one-half to four parts by weight of plasticizer with one part of polyvinyl halide, though in some instances greater or less amounts may be used. Carbon black, clay, barytes, zinc oxide, wood flour, and other pigments and fillers commonly used in the rubber and plastics industries may be included in the compositions.

Not only are the compounds of this composition good plasticizers, but they impart unusual solvent-resisting properties to the compositions in which they are used. It has long been known that polyvinyl halides were extremely resistant to a wide variety of solvents, but they became rather stiff and boardy when used in contact with oxidizing acids such as concentrated nitric acid. Polyvinyl halide compositions containing the plasticizers of this invention, however, may be used in concentrated acids for long periods of time without markedly impairing their flexibility. This unusual property makes the compositions very useful as tank linings, pipe linings, stoppers, etc.

The plasticizers of this invention also improve the dielectric properties of compositions in which they are used. Compositions containing many ordinary plasticizers such as ortho-nitro diphenyl-ether or butyl phthalyl butyl glycollate have very poor dielectric properties. Compositions containing the plasticizers of this invention, however, have excellent dielectric properties which make them useful as coatings on electrical conductors. The dielectric constant and power factor of compositions plasticized with the materials of this invention are lower and the insulation resistance is higher than when I use tricresyl phosphate, which imparts to polyvinyl halides the best dielectric properties of any plasticizers ordinarily used therein.

Although I have herein disclosed specific embodiments of my invention, I do not limit myself wholly thereto, for many modifications such as the substitution of equivalent materials and the variation of proportions used are within the spirit and scope of the invention as defined in the appended claims.

I claim:

1. The method which comprises plasticizing gamma polyvinyl chloride with a compound having the structural formula

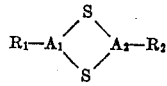

wherein $R_1$ and $R_2$ represent a member of the class consisting of aliphatic and alicyclic hydrocarbon groups containing between two and six carbon atoms, and $A_1$ and $A_2$ represent aromatic hydrocarbon nuclei with the sulfur linkages in the ortho position.

2. The method which comprises plasticizing gamma polyvinyl chloride with bis-ethyl-o-phenylene disulfide.

3. The method which comprises plasticizing gamma polyvinyl chloride with bis-cyclohexyl-o-phenylene disulfide.

4. The method which comprises plasticizing gamma polyvinyl chloride with bis-amyl-o-phenylene disulfide.

5. A plasticized composition comprising gamma polyvinyl chloride and a compound having the structural formula

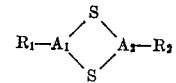

wherein $R_1$ and $R_2$ represent a member of the class consisting of aliphatic and alicyclic hydrocarbon groups containing between two and six carbon atoms, and $A_1$ and $A_2$ represent aromatic hydrocarbon nuclei with the sulfur linkage in the ortho position.

6. A plasticized composition comprising gamma polyvinyl chloride and bis-ethyl-o-phenylene disulfide.

7. A plasticized composition comprising gamma polyvinyl chloride and bis-cyclohexyl-o-phenylene disulphide.

8. A plasticized composition comprising gamma polyvinyl chloride and bis-amyl-o-phenylene disulfide.

CLAUDE H. ALEXANDER.